United States Patent
Tian et al.

(10) Patent No.: US 12,259,513 B1
(45) Date of Patent: Mar. 25, 2025

(54) SAND SHALE FORMATION LITHOLOGY EVALUATION METHOD AND SYSTEM FOR PRECISE DEEP OIL AND GAS NAVIGATION

(71) Applicant: INSTITUTE OF GEOLOGY AND GEOPHYSICS, CHINESE ACADEMY OF SCIENCES, Beijing (CN)

(72) Inventors: Fei Tian, Beijing (CN); Wenhao Zheng, Beijing (CN); Qingyun Di, Beijing (CN); Yongyou Yang, Beijing (CN); Wenjing Cao, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 18/827,894

(22) Filed: Sep. 9, 2024

(30) Foreign Application Priority Data

Sep. 19, 2023 (CN) .......................... 202311205159.2

(51) Int. Cl.
*G01V 11/00* (2006.01)
(52) U.S. Cl.
CPC ................................ *G01V 11/002* (2013.01)
(58) Field of Classification Search
CPC .................................................... G01V 11/002
See application file for complete search history.

(56) References Cited

U.S. PATENT DOCUMENTS

| | | | | |
|---|---|---|---|---|
| 4,937,747 A | * | 6/1990 | Koller | ..................... E21B 44/00 |
| | | | | 324/323 |
| 7,363,161 B2 | * | 4/2008 | Georgi | ..................... G01V 3/32 |
| | | | | 702/9 |

(Continued)

FOREIGN PATENT DOCUMENTS

| CN | 104866636 A | 8/2015 |
|---|---|---|
| CN | 104933722 A | 9/2015 |

(Continued)

OTHER PUBLICATIONS

Zheng Jian, et al., Correcting Errors Due to Borehole and Formation Factors during Azimuthal Gamma Spectrum Logging While Drilling, Petroleum Drilling Techniques, 2020, pp. 104-113, vol. 48 No. 1.

(Continued)

*Primary Examiner* — Elias Desta
(74) *Attorney, Agent, or Firm* — Bayramoglu Law Offices LLC

(57) ABSTRACT

A sand shale formation lithology evaluation method and system for precise deep oil and gas navigation aims to solve the problem in the prior art, that is, the accuracy of the logging-while-drilling (LWD) azimuthal resistivity is insufficient due to an equipment or technology deficiency. The method includes: acquiring density distribution data, gamma distribution data, and resistivity distribution data of a target location; amplifying the data to acquire amplified logging distribution data; clustering the data to acquire clustered logging data; adding stratigraphic information to the clustered data; performing dimensionality reduction by a principal component analysis (PCA) method, and taking dimensionality-reduced data as a weight of azimuthal logging data to acquire an LWD feature dataset; predicting missing LWD photoelectric data through the LWD feature dataset; and acquiring a formation lithology evaluation result based on an (Continued)

LWD photoelectric data prediction curve. The method and system improves the accuracy of LWD lithology evaluation.

4 Claims, 2 Drawing Sheets

(56) References Cited

U.S. PATENT DOCUMENTS

| | | | |
|---|---|---|---|
| 8,573,298 B2* | 11/2013 | Jacobi | G01V 11/00 166/254.2 |
| 8,714,246 B2* | 5/2014 | Pop | E21B 7/04 166/264 |
| 2018/0349158 A1 | 12/2018 | Swersky et al. | |
| 2021/0047910 A1* | 2/2021 | Madasu | G06N 3/084 |

FOREIGN PATENT DOCUMENTS

| | | |
|---|---|---|
| CN | 115661515 A | 1/2023 |
| CN | 115749755 A | 3/2023 |
| CN | 116484717 A | 7/2023 |
| WO | 2023081113 A1 | 5/2023 |

OTHER PUBLICATIONS

Tian Fei, et al., A Formation Intelligent Evaluation Solution for Geosteering, Chinese Journal of Geophysics, 2023, pp. 3875-3989, vol. 66 No. 9.

Xiurong Chi, et al., Geochemical Photoelectric (PE) Logging, World Well Logging Technology, 2018, pp. 72-76, vol. 39 No. 2.

* cited by examiner

SAND SHALE FORMATION LITHOLOGY EVALUATION METHOD AND SYSTEM FOR PRECISE DEEP OIL AND GAS NAVIGATION

CROSS REFERENCE TO THE RELATED APPLICATIONS

This application is based upon and claims priority to Chinese Patent Application No. 202311205159.2, filed on Sep. 19, 2023, the entire contents of which are incorporated herein by reference.

TECHNICAL FIELD

The present disclosure belongs to the field of geological exploration, and in particular relates to a sand shale formation lithology evaluation method and system for precise deep oil and gas navigation.

BACKGROUND

Drilling oil and gas wells is a complex process that involves many operational factors and significant geological uncertainties. Understanding the geological environment is crucial for placing wells in optimal positions in hard-rock drilling and geo-steering applications. The use of measurement while drilling (MWD) and logging while drilling (LWD) data for advanced analysis is a method for gaining a deep understanding of mechanical properties of the rock surrounding the drill bit. Acoustic LWD is commonly used to estimate the mechanical properties of rocks, which can be combined with seismic data to greatly reduce the ambiguity of geological interpretation, thereby constructing accurate oil and gas reservoir models. However, due to cost constraint or wellbore issues, acoustic LWD data may be missing in certain wells in the target area. Therefore, the estimation must be based on other common logging data.

Fundamentally, it is a challenging task to predict missing logging data through mathematical methods. Predicting missing logging data at a specific depth based on other logging data measured at the same depth implicitly assumes that the measured logging data includes sufficient reconstruction information. However, this dependency relationship between the missing logging data and the measured logging data may not exist, either partially or completely. In practice, it is often assumed that the predicted and measured logging data are complementary, so as to provide geoscientists with multi-dimensional views of the underground or effectively provide a more complete characterization of the underground. However, if it is assumed that there is a certain dependency relationship between these logging data, attempts to establish the relationship based solely on local analysis may be limited.

The photoelectric factor (PEF) curve is closely related to the lithology of the formation, but it may be missing due to an instrument deficiency or malfunction. For example, in the drilling process in a sand shale formation, it is hard to acquire an adequate amount of sufficiently accurate photoelectric information in a timely manner to achieve real-time lithology evaluation of the sand shale formation, resulting in insufficient accuracy (Chi Xiurong; Lv Wei (China National Petroleum Corporation (CNPC) Logging Tianjin Branch). Geochemical Photoelectric (PE) Logging. 2018).

SUMMARY

The present disclosure aims to solve the above-mentioned problem in the prior art, that is, the accuracy of the logging-while-drilling (LWD) azimuthal resistivity is insufficient due to an equipment or technology deficiency, resulting in insufficient accuracy in lithology evaluation of the sand shale formation. For this purpose, the present disclosure provides a sand shale formation lithology evaluation method for precise deep oil and gas navigation, including:

S100: acquiring logging distribution data of a target location, where the logging distribution data includes density distribution data, gamma distribution data and resistivity distribution data, where the density distribution data, the gamma distribution data and the resistivity distribution data are represented as 8-sector data; and amplifying the density distribution data, the gamma distribution data and the resistivity distribution data of the target location through an Akima interpolation method to acquire amplified logging distribution data, where the amplified logging distribution data is represented as 32-sector data, including amplified density distribution data, amplified gamma distribution data, and amplified resistivity distribution data;

where, the amplifying the density distribution data, the gamma distribution data and the resistivity distribution data of the target location through an Akima interpolation method to acquire amplified logging distribution data specifically includes:

for any two adjacent data points $x_k$ and $x_{k+1}$, ($k=0, 1, 2, \ldots, n$):

acquiring a constraint condition for a fitted curve:

$$\begin{cases} y_k = S(x_k) \\ y_{k+1} = S(x_{k+1}) \\ y'_k = t_k \\ y'_{k+1} = t_{k+1} \end{cases};$$

where, $y_k$ denotes an actual logging value at $x_k$; $k+1$ denotes an actual logging value at $x_{k+1}$; $t_k$ denotes a slope of the fitted curve at $x_k$ and $x_{k+1}$; $t_{k+1}$ denotes a slope at $x_{k+1}$ and $x_{k+2}$; $S(x_k)$ denotes a value of a cubic polynomial interpolation equation at $x_k$; $y_k'$ denotes a slope of the actual logging value at $x_k$; and $y_{k+1}'$ denotes a slope of the actual logging value at $x_{k+1}$;

constructing the cubic polynomial interpolation equation:

$S(x) = c_0 + c_1(x-x_k) + c_2(x-x_k)^2 + (c_3(x-x_k)^3;$ where, $S(x)$ denotes an interval function corresponding to an interval of $[x_k, x_{k+1}]$; $x_k$ and $x_{k+1}$ denote two adjacent data points; and $c_0$, $c_1$, $c_2$, and $c_3$ are constant parameters to be determined;

calculating an interpolation point for each interval based on the cubic polynomial interpolation equation;

calculating, based on the interpolation point, an interval interpolation equation through adjacent data points;

where, $t_k$ and $t_{k+1}$ are expressed as follows:

$$t_k = \frac{|m_{k+1} - m_k|m_{k+1} + |m_{k-1} - m_{k-2}|m_k}{|m_{k+1} - m_k| + |m_{k-1} - m_{k-2}|};$$

$$t_{k+1} = \frac{|m_{k+2} - m_{k+1}|m_k + |m_k - m_{k-1}|m_{k+1}}{|m_{k+2} - m_{k+1}| + |m_k - m_{k-1}|};$$

where, $m_k$ denotes the slope at the two data points $x_k$ and $x_{k+1}$:

$$m_k = \frac{y_{k+1} - y_k}{x_{k+1} - x_k};$$

$m_{k+1}$ denotes a slope at two data points $x_{k+1}$ and $x_{k+2}$; $m_{k-1}$ denotes a slope at two data points $x_{k-1}$ and $x_k$; $m_{k-2}$ denotes a slope at two data points $x_{k-2}$ and $x_{k-1}$; and $m_{k+2}$ denotes a slope at two data points $x_{k+2}$ and $x_{k+3}$; and acquiring the amplified logging distribution data;

S200: standardizing the amplified logging distribution data to acquire standardized amplified logging distribution data, where the standardized amplified logging distribution data includes standardized amplified density distribution data, standardized amplified gamma distribution data, and standardized amplified resistivity distribution data; and clustering the amplified logging distribution data to acquire clustered logging data;

S300: performing stratigraphic division based on the clustered logging data, acquiring stratum thicknesses $d_{str}$, and assigning stratum labels to the clustered logging data to acquire clustered logging data with stratigraphic information;

S400: performing dimensionality reduction on the clustered logging data with stratigraphic information to acquire first dimensionality-reduced logging data, and taking the first dimensionality-reduced logging data as a weight parameter of the standardized amplified logging distribution data to acquire a logging-while-drilling (LWD) feature dataset;

S500: acquiring, based on the LWD feature dataset, an LWD photoelectric data prediction curve through a trained missing curve prediction model; and S600: calculating, based on the LWD photoelectric data prediction curve, an average value of photoelectric data of each stratum, and acquiring a lithology evaluation result of each stratum.

In some preferred implementations, the step S200 includes:

S210: taking the amplified logging distribution data as data to be clustered, and calculating distances $d[(y_{i1}, y_{i2}), (y_{j1}, y_{j2})]$ between all nodes:

$$d[(y_{i1}, y_{i2}), (y_{j1}, y_{j2})] = \left(\sum_{k=1}^{2}|y_{ik} - y_{jk}|^2\right)^{1/2};$$

where, k denotes a coordinate marker; $(y_{i1}, y_{i2})$ and $(y_{j1}, y_{j2})$ denote positions of first and second nodes, respectively; and $Y_{ik}$ and $Y_{jk}$ denote positions of two different nodes;

S220: setting a cut-off distance dc, and clustering upcoming logging data into five clusters based on the distances between the nodes, where the five clusters include four marker layer clusters and one destination layer cluster;

S230: calculating, based on the data to be clustered, a density $\rho_i$ of each node:

$$\rho_i = \sum_j x(d_{ij} - dc);$$

where, the density $\rho_i$ denotes a number of nodes each with a distance from the i-th node less than the cut-off distance dc; $d_{ij}$ denotes a distance between the i-th node and the j-th node; and x denotes a value of the node;

S240: calculating, based on the data to be clustered, a relative distance $\delta$ of each node:

$$\delta_i = \begin{cases} \max(d_{ij}), & \rho_i > \rho_j \\ \min(d_{ij}), & \rho_i \le \rho_j \end{cases};$$

where, the relative distance of the i-th node is denoted as $\delta_i$; if the density of the i-th node is not the largest among all the nodes, a distance from the i-th node to the nearest j-th node with a larger density than the i-th node is selected; and if the density of the i-th node is the largest among all the nodes, a largest distance from the i-th node to the nearest j-th node is calculated;

S250: selecting, based on the data to be clustered, a point with the relative distance $\delta$ larger than a preset first threshold and the density larger than a preset second threshold as a cluster center; and S260: assigning all data points that are not cluster centers to a nearest cluster center with the largest density to acquire the clustered logging data, where the clustered logging data includes a mapping relationship between a marker layer and a non-marker layer.

In some preferred implementations, the step S300 specifically includes:

acquiring, based on the clustered logging data, the thicknesses $d_{str}$ of five strata, $str \in (1, 2, 3, 4, 5)$, where data points of the five strata are $5 \times d_{str}$; and assigning stratum labels to the clustered logging data to acquire the clustered logging data with stratigraphic information.

In some preferred implementations, the step S400 specifically includes:

S410: calculating, based on the clustered logging data with stratigraphic information, an average value of the clustered logging data with stratigraphic information at a same stratum depth for a same imaging type, and acquiring an average value of standardized amplified density distribution clustered logging data, an average value of standardized amplified gamma distribution clustered logging data, and an average value of standardized amplified resistivity distribution clustered logging data;

S420: reducing, by a principal component analysis (PCA) dimensionality reduction method, the average value of the standardized amplified density distribution clustered logging data, the average value of the standardized amplified gamma distribution clustered logging data, and the average value of the standardized amplified resistivity distribution clustered logging data to one dimension to acquire the first dimensionality-reduced logging data, where the first dimensionality-reduced logging data includes density distribution dimensionality-reduced logging data $w_{den}$, gamma distribution dimensionality-reduced logging data $w_{gr}$, and resistivity distribution dimensionality-reduced logging data $w_{rt}$; and S430: based on the first dimensionality-reduced logging data and the stratum thicknesses $d_{str}$, constructing the LWD feature dataset.

In some preferred implementations, the LWD photoelectric data prediction curve is acquired through the trained missing curve prediction model as follows:

forming the missing curve prediction model, including a t-channel image recognition network with 2t convolutional layers and 2t average pooling layers, where each channel includes a first convolutional layer, a first average pooling layer, a second convolutional layer and a second average pooling layer that are sequentially connected; each convolutional layer has a different size; an f-th channel includes a (4×f−1)×(4×f−1) first convolutional layer, a (4×f+4)×(4×f+4) second convolutional layer, and 2×2 pooling layers; and all the channels are connected together to one fully connected layer and one naive Bayesian decision maker;

denoting the first convolutional layer of a first channel, the first convolutional layer of a second channel, and the first convolutional layer of a third channel as C1, C3, and C5 layers, respectively, where the C1 layer is configured to convolve an input image through 8 $h_f \times h_f$ convolution kernels; the C3 layer is configured to convolve an input image through 8 $3h_f \times 3h_f$ convolution kernels; and the C5 layer is configured to convolve an input image through 8 $5h_f \times 5h_f$ convolution kernels;

$$con_{p,q}^l = \sum_{m1=1}^{L} \sum_{m2=1}^{W} CON_{m1,m2}^{l-1} \times ker_{p,q}^l + b_{p,q}^l;$$

$con_{p,q}^l$ denotes a convolution result at a position (p, q); l denotes a current layer number; CON denotes a matrix covered by the convolution kernels; L and W denote a length and a width of the matrix covered by the convolution kernels; m1 and m2 denote serial numbers of lengths of the convolution kernels, m1 ranging from 1 to L, and m2 ranging from 1 to W; ker denotes a kernel function; and b denotes a corresponding bias term;

fitting the convolution result through a rectified linear unit (ReLU) function to acquire a fitted convolution result;
performing upsampling pooling on the fitted convolution result:

$$con_{m3,m4}^l = \max(CON_{m1,m2}^{l-1});$$

where, $con_{m3,m4}^l$ denotes a two-dimensional matrix representation of a pooled convolution result; and (m3, m4) denotes a position of the convolution result;
converting the pooled convolution result into a tiled one-dimensional feature vector through a tiling layer;
integrating the tiled one-dimensional feature vector through the fully connected layer:

$$con_{key}^l = \sum_{r=1}^{R} con_r^{key-1} \cdot w_r^l + b_r^l;$$

where, $con_{key}^l$ denotes a one-dimensional matrix representation of a feature after the integration through the fully connected layer; l denotes the current layer number; key denotes an index value of a one-dimensional matrix; R denotes a length of a feature vector in an (l−1)-th layer; w denotes a weight matrix; b denotes the bias term; and r denotes a serial number of a data point of the feature vector;

introducing the naive Bayesian decision maker into the fully connected layer; and
taking the integrated tiled one-dimensional feature vector as the LWD photoelectric data prediction curve.

Another aspect of the present disclosure proposes a sand shale formation lithology evaluation system for precise deep oil and gas navigation, including:

a data amplification module, configured to:
acquire logging distribution data of a target location, where the logging distribution data includes density distribution data, gamma distribution data and resistivity distribution data, where the density distribution data, the gamma distribution data and the resistivity distribution data are represented as 8-sector data; and amplify the density distribution data, the gamma distribution data and the resistivity distribution data of the target location through an Akima interpolation method to acquire amplified logging distribution data, where the amplified logging distribution data is represented as 32-sector data, including amplified density distribution data, amplified gamma distribution data, and amplified resistivity distribution data, where, specifically, the density distribution data, the gamma distribution data and the resistivity distribution data of the target location are amplified through the Akima interpolation method to acquire the amplified logging distribution data as follows:

for any two adjacent data points $x_k$ and $x_{k+1}$, (k=0, 1, 2, ..., n):
acquiring a constraint condition for a fitted curve:

$$\begin{cases} y_k = S(x_k) \\ y_{k+1} = S(x_{k+1}) \\ y_k' = t_k \\ y_{k+1}' = t_{k+1} \end{cases};$$

where, $y_k$ denotes an actual logging value at $x_k$; $y_{k+1}$ denotes an actual logging value at $x_{k+1}$; $t_k$ denotes a slope of the fitted curve at $x_k$ and $x_{k+1}$; $t_{k+1}$ denotes a slope at $x_{k+1}$ and $x_{k+2}$; $S(x_k)$ denotes a value of a cubic polynomial interpolation equation at $x_k$; $y_k'$ denotes a slope of the actual logging value at $x_k$; and $y_{k+1}'$ denotes a slope of the actual logging value at $x_{k+1}$;

constructing the cubic polynomial interpolation equation:

$$S(x) = c_0 + c_1(x-x_k) + c_2(x-x_k)^2 + c_3(x-x_k)^3;$$

where, $S(x)$ denotes an interval function corresponding to an interval of $[x_k, x_{k+1}]$; $x_k$ and $x_{k+1}$ denote two adjacent data points; and $c_0$, $c_1$, $c_2$, and $c_3$ are constant parameters to be determined;

calculating an interpolation point for each interval based on the cubic polynomial interpolation equation;
calculating, based on the interpolation point, an interval interpolation equation through adjacent data points;
where, $t_k$ and $t_{k+1}$ are expressed as follows:

$$t_k = \frac{|m_{k+1} - m_k| m_{k+1} + |m_{k-1} - m_{k-2}| m_k}{|m_{k+1} - m_k| + |m_{k-1} - m_{k-2}|};$$

$$t_{k+1} = \frac{|m_{k+2} - m_{k+1}| m_k + |m_k - m_{k-1}| m_{k+1}}{|m_{k+2} - m_{k+1}| + |m_k - m_{k-1}|};$$

where, $m_k$ denotes the slope at the two data points $x_k$ and $x_{k+1}$:

$$m_k = \frac{y_{k+1} - y_k}{x_{k+1} - x_k};$$

$m_{k+1}$ denotes a slope at two data points $x_{k+1}$ and $x_{k+2}$; $m_{k-1}$ denotes a slope at two data points $x_{k-1}$ and $x_k$; $m_{k-2}$ denotes a slope at two data points $x_{k-2}$ and $x_{k-1}$; and $m_{k+2}$ denotes a slope at two data points $x_{k+2}$ and $x_{k+3}$; and acquiring the amplified logging distribution data;

a data clustering module, configured to standardize the amplified logging distribution data to acquire standardized amplified logging distribution data, where the standardized amplified logging distribution data includes standardized amplified density distribution data, standardized amplified gamma distribution data, and standardized amplified resistivity distribution data; and cluster the amplified logging distribution data to acquire clustered logging data;

a stratigraphic information addition module, configured to perform stratigraphic division based on the clustered logging data, acquire stratum thicknesses $d_{str}$, and assign stratum labels to the clustered logging data to acquire clustered logging data with stratigraphic information;

a weight calculation module, configured to perform dimensionality reduction on the clustered logging data with stratigraphic information to acquire first dimensionality-reduced logging data, and take the first dimensionality-reduced logging data as a weight parameter of the standardized amplified logging distribution data to acquire an LWD feature dataset;

a missing curve prediction module, configured to acquire, based on the LWD feature dataset, an LWD photoelectric data prediction curve through a trained missing curve prediction model; and a formation lithology evaluation module, configured to calculate, based on the LWD photoelectric data prediction curve, an average value of photoelectric data of each stratum, and acquire a lithology evaluation result of each stratum.

The present disclosure has following beneficial effects:

(1) The present disclosure divides the clustered logging data based on strata and reduces the dimensionality of the data to acquire a weight for the standardized azimuthal logging data, improving the prediction accuracy of photoelectric data generated from standardized azimuthal logging data and enhancing the accuracy of formation lithology evaluation.

BRIEF DESCRIPTION OF THE DRAWINGS

Other features, objectives and advantages of the present disclosure will become more apparent upon reading the detailed description of the non-restrictive embodiments with reference to the following drawings.

DETAILED DESCRIPTION OF THE EMBODIMENTS

Figure 1:
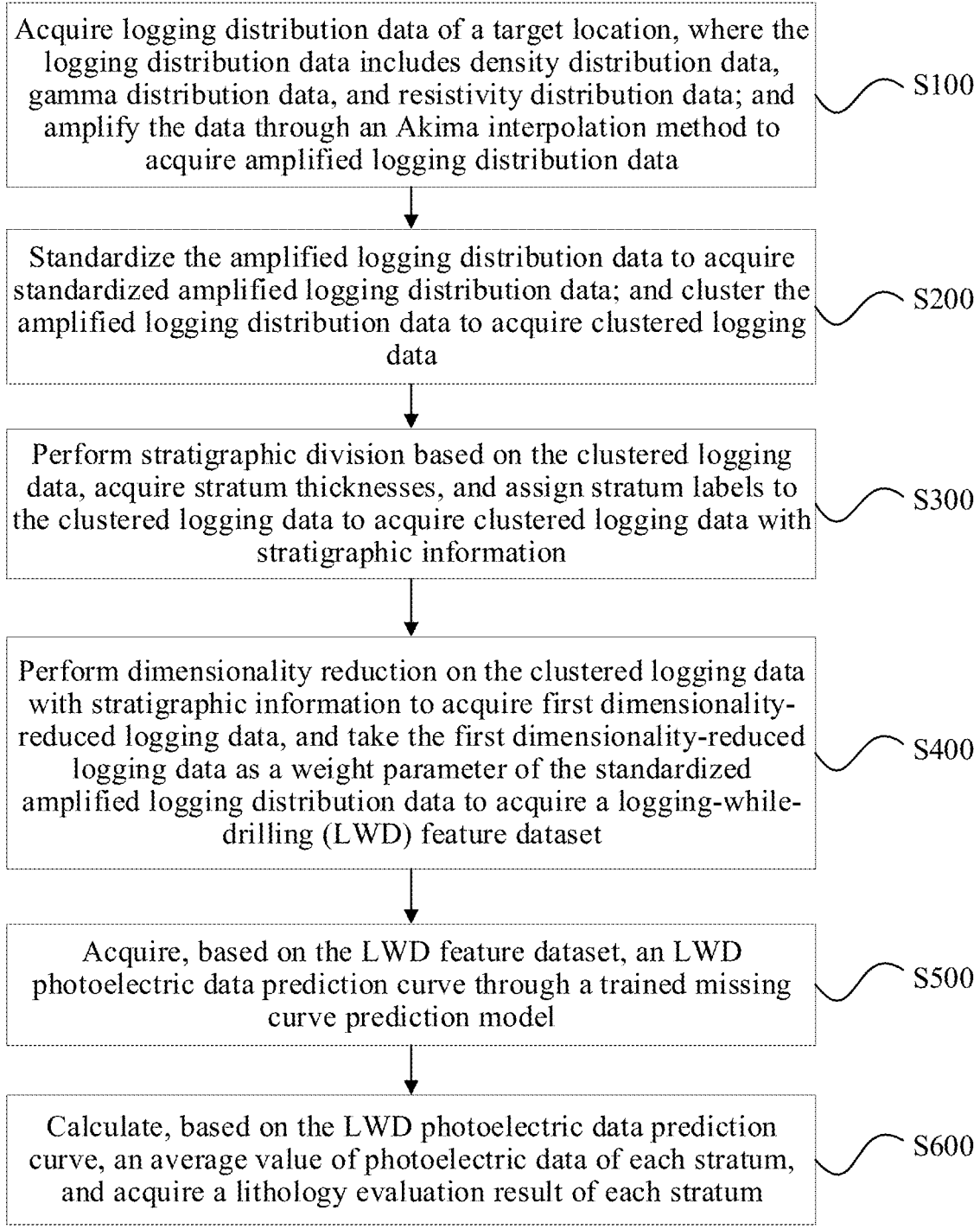
FIG. 1 is a flowchart of a sand shale formation lithology evaluation method for precise deep oil and gas navigation according to an embodiment of the present disclosure.

The present disclosure will be further described in detail below with reference to the drawings and embodiments. It should be understood that the specific embodiments described herein are merely intended to explain the present disclosure, rather than to limit the present disclosure. It should also be noted that, for convenience of description, only the parts related to the present disclosure are shown in the drawings.

It should be noted that the embodiments in the present disclosure and features in the embodiments may be combined with each other in a non-conflicting situation. The present disclosure will be described in detail below with reference to the drawings and embodiments.

To more clearly explain a sand shale formation lithology evaluation method for precise deep oil and gas navigation, steps in the embodiments of the present disclosure are described in detail below with reference to FIG. 1.

As a special technique of geophysical logging, LWD PEF logging is used to measure the photoelectric response characteristics of the formation. This technique mainly focuses on the absorption and scattering of incident radiation (such as natural gamma rays or X-rays) by rocks in the geological formation. The particularity of PEF logging lies in its ability to directly observe the composition and lithology of the geological formation, the application value of PEF logging is especially significant for rocks containing minerals. Imaging logging while drilling can reflect the lithological information of logging from a two-dimensional perspective and is the best data source for extracting lithological features. Different minerals and rock compositions have different responses to radiation, and PEF logging can distinguish different types of rocks by measuring the absorption and scattering of radiation by the formation. PEF logging has advantages in distinguishing fine-grained rocks such as sandstone and shale. Due to the differences in photoelectric response characteristics, PEF logging can help determine whether there are shale or fine-grained sedimentary rocks in the formation. The photoelectric response of rocks is influenced by changes in lithology. Therefore, PEF logging can help identify lithological transitions in formations, such as the transition from carbonate rocks to mudstone. It is necessary to adopt a completely different prediction method from acoustic LWD and resistivity LWD.

A first embodiment of the present disclosure provides a sand shale formation lithology evaluation method for precise deep oil and gas navigation. The method includes steps S100 to S600, which are described in detail as follows.

The PEF curve is closely related to the lithology of the formation. The present disclosure predicts the PEF LWD curve based on density distribution data, gamma distribution data, and resistivity distribution data during the drilling process, namely azimuthal resistivity imaging data.

The response of PEF varies greatly in formations of different lithologies. If the same PEF missing curve prediction algorithm is used for all formations, the results acquired will be inaccurate. Therefore, specific PEF missing curve prediction algorithms are needed for formations of different lithologies.

In a sand shale formation, the density distribution data, the gamma distribution data and the resistivity distribution data, namely the azimuthal resistivity imaging data, are sensitive to changes in formation interfaces. Therefore, stratum boundaries can be determined based on the density distribution data, the gamma distribution data and the resistivity distribution data to determine different stratum thicknesses.

Figure 2:
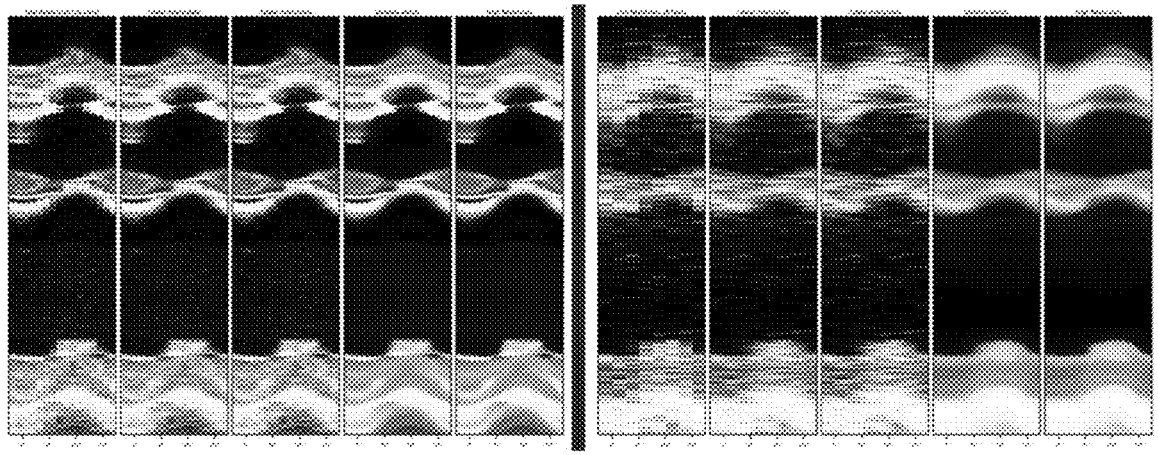
FIG. 2 is a schematic diagram of different degrees of data amplifications by the sand shale formation lithology evaluation method for precise deep oil and gas navigation according to an embodiment of the present disclosure.

S100. Logging distribution data of a target location is acquired, where the logging distribution data includes density distribution data, gamma distribution data and resistivity distribution data, where the density distribution data, the gamma distribution data and the resistivity distribution data are represented as 8-sector data. The density distribution data, the gamma distribution data and the resistivity distribution data of the target location are amplified through an Akima interpolation method to acquire amplified logging distribution data, where the amplified logging distribution data is represented as 32-sector data, including amplified density distribution data, amplified gamma distribution data, and amplified resistivity distribution data. The 32-sector data is shown in the far right in FIG. 2.

Specifically, the density distribution data, the gamma distribution data and the resistivity distribution data of the target location are amplified through the Akima interpolation method to acquire the amplified logging distribution data as follows.

For any two adjacent data points $x_k$ and $x_{k+1}$, (k=0, 1, 2, ..., n):

A constraint condition for a fitted curve is acquired:

$$\begin{cases} y_k = S(x_k) \\ y_{k+1} = S(x_{k+1}) \\ y'_k = t_k \\ y'_{k+1} = t_{k+1} \end{cases} ;$$

where, $y_k$ denotes an actual logging value at $x_k$; $y_{k+1}$ denotes an actual logging value at $x_{k+1}$; $t_k$ denotes a slope of the fitted curve at $x_k$ and $x_{k+1}$; $t_{k+1}$ denotes a slope at $x_{k+1}$ and $x_{k+2}$; $S(x_k)$ denotes a value of a cubic polynomial interpolation equation at $x_k$; $y_k'$ denotes a slope of the actual logging value at $x_k$; and $y_{k+1}'$ denotes a slope of the actual logging value at $x_{k+1}$.

The cubic polynomial interpolation equation is constructed:

$$S(x)=c_0+c_1(x-x_k)+c_2(x-x_k)^2+c_3(x-x_k)^3;$$

where, S(X) denotes an interval function corresponding to an interval of $[x_k, x_{k+1}]$; $x_k$ and $x_{k+1}$ denote two adjacent data points; and $c_0$, $c_1$, $c_2$, and $c_3$ are constant parameters to be determined.

An interpolation point for each interval is calculated based on the cubic polynomial interpolation equation.

Based on the interpolation point, an interval interpolation equation is calculated through adjacent data points.

$t_k$ and $t_{k+1}$ are expressed as follows:

$$t_k = \frac{|m_{k+1} - m_k|m_{k+1} + |m_{k-1} - m_{k-2}|m_k}{|m_{k+1} - m_k| + |m_{k-1} - m_{k-2}|}; \text{ and}$$

$$t_{k+1} = \frac{|m_{k+2} - m_{k+1}|m_k + |m_k - m_{k-1}|m_{k+1}}{|m_{k+2} - m_{k+1}| + |m_k - m_{k-1}|};$$

where, $m_k$ denotes the slope at the two data points $x_k$ and $x_{k+1}$:

$$m_k = \frac{y_{k+1} - y_k}{x_{k+1} - x_k}.$$

$m_{k+1}$ denotes a slope at two data points $x_{k+1}$ and $x_{k+2}$; $m_{k-1}$ denotes a slope at two data points $x_{k-1}$ and $x_k$; $m_{k-2}$ denotes a slope at two data points $x_{k-2}$ and $x_{k-1}$; and $m_{k+2}$ denotes a slope at two data points $x_{k+2}$ and $x_{k+3}$.

The amplified logging distribution data is acquired. It is not possible to use the method of calculating slope to supplement at the beginning and end endpoints, so it is necessary to supplement two points outside the endpoints based on the trend of the curve.

In this embodiment, it is assumed that endpoint $(x_n, y_n)$ and data points $(x_{n-1}, y_{n-1})$ and $(x_{n-2}, y_{n-2})$ are known, so data points $(x_{n+1}, y_{n+1})$ and $(x_{n+2}, y_{n+2})$ need to be supplemented. These five points are all on curve S(x), and:

$$x_{n+2}-x_n=x_{n+1}-x_{n-1}=x_n-x_{n-2}.$$

It can be derived that:

$$\frac{y_{n+2} - y_{n+1}}{x_{n+2} - x_{n+1}} - \frac{y_{n+1} - y_n}{x_{n+1} - x_n} = \frac{y_{n+1} - y_n}{x_{n+1} - x_n} - \frac{y_n - y_{n-1}}{x_n - x_{n-1}} = \frac{y_n - y_{n-2}}{x_n - x_{n-2}}.$$

That is:

$$m_{n+1}-m_n=m_n-m_{n-1}=m_{n-1}-m_{n-2}.$$

Then:

$$m_n=2m_{n-1}-m_{n-2}; \text{ and}$$

$$m_{n+1}=2m_n-m_{n-1}.$$

When $$m_k = m_{k+1} \text{ and } m_{k-1} = m_{k-2}:$$

$$t_k = \frac{m_{k-1} + m_k}{2}; \text{when}$$

$$m_{k+2} = m_{k+1} \text{ and } m_k = m_{k-1}:$$

$$t_{k+1} = \frac{m_k + m_{k+1}}{2}.$$

The cubic polynomial interpolation equation is calculated:

$$\begin{cases} c_o = y_k \\ c_1 = t_k \\ c_2 = \frac{3m_k - 2t_k - t_{k+1}}{x_{k+1} - x_k} \\ c_3 = \frac{t_{k+1} - t_k - 2m_k}{(x_{k+1} - x_k)^2} \end{cases} .$$

Therefore, the cubic polynomial interpolation equation is acquired.

S200. The amplified logging distribution data is standardized to acquire standardized amplified logging distribution data, where the standardized amplified logging distribution data includes standardized amplified density distribution data, standardized amplified gamma distribution data, and standardized amplified resistivity distribution data.

The amplified logging distribution data is clustered to acquire clustered logging data. The amplified density distribution data and the amplified resistivity distribution data are standardized. The clustering analysis is performed based on 3×32=96 curves to achieve stratigraphic division.

In this embodiment, the step S200 includes the following sub-steps.

S210. The amplified logging distribution data is taken as data to be clustered, and distances $d[y_{i1},y_{i2}),(y_{j1},y_{j2})]$ between all nodes are calculated:

$$d[(y_{i1}, y_{i2}), (y_{j1}, y_{j2})] = \left(\sum_{k=1}^{2}|y_{ik} - y_{jk}|^2\right)^{1/2};$$

where, k denotes a coordinate marker; ($y_{i1}$, $y_{i2}$) and ($Y_{j1}$, $y_{j2}$) denote positions of first and second nodes, respectively; and $y_{ik}$ and $y_{jk}$ denote positions of two different nodes.

S220. A cut-off distance dc is set, and upcoming logging data is clustered into five clusters based on the distances between the nodes, where the five clusters include four marker layer clusters and one destination layer cluster.

Parameters based on density peak clustering are set. When considering recognition efficiency and accuracy, it is hoped that there are more clusters, so as to distinguish the stratigraphic information reflected between clusters as much as possible and avoid the phenomenon of one cluster reflecting multiple strata to the greatest extent. Smaller cut-off distance dc will generate more categories, corresponding to more detailed stratigraphic characteristics. However, too many categories can lead to too low operational efficiency. Therefore, based on a comprehensive analysis, the value of DC is determined to generate approximately 30 categories.

S230. Based on the data to be clustered, density $\rho_i$ of each node is calculated:

$$\rho_i = \sum_j x(d_{ij} - dc);$$

where, the density $\rho_i$ denotes a number of nodes each with a distance from the i-th node less than the cut-off distance dc; $d_{ij}$ denotes a distance between the i-th node and the j-th node; and x denotes a value of the node.

S240. Based on the data to be clustered, relative distance $\delta$ of each node is calculated:

$$\delta_i = \begin{cases} \max(d_{ij}), & \rho_i > \rho_j \\ \min(d_{ij}), & \rho_i \leq \rho_j \end{cases};$$

where, the relative distance of the i-th node is denoted as $\delta_i$; if the density of the i-th node is not the largest among all the nodes, a distance from the i-th node to the nearest j-th node with a larger density than the i-th node is selected; and if the density of the i-th node is the largest among all the nodes, a largest distance from the i-th node to the nearest j-th node is calculated.

S250. Based on the data to be clustered, a point with the relative distance $\delta$ larger than a preset first threshold and the density larger than a preset second threshold is selected as a cluster center.

In this embodiment, a two-dimensional image is plotted with the density $\rho_i$ as the x-axis and the relative distance $\delta$ as the y-axis. Points with larger relative distances $\delta$ and higher densities serve as cluster centers, usually located in the upper right corner of the two-dimensional image. For each remaining point, it belongs to a cluster of nearest and denser nodes.

S260. All data points that are not cluster centers are assigned to a nearest cluster center with the largest density to acquire the clustered logging data, where the clustered logging data includes a mapping relationship between a marker layer and a non-marker layer.

S300. Stratigraphic division is performed based on the clustered logging data, stratum thicknesses $d_{str}$ are acquired, and stratum labels are assigned to the clustered logging data to acquire clustered logging data with stratigraphic information.

In this embodiment, the step S300 IS specifically as follows.

Based on the clustered logging data, the thicknesses $d_{str}$ of five strata are acquired, str∈(1, 2, 3, 4, 5), where data points of the five strata are $5 \times d_{str}$. Stratum labels are assigned to the clustered logging data to acquire the clustered logging data with stratigraphic information.

S400. Dimensionality reduction is performed on the clustered logging data with stratigraphic information to acquire first dimensionality-reduced logging data, and the first dimensionality-reduced logging data are taken as a weight parameter of the standardized amplified logging distribution data to acquire a logging-while-drilling (LWD) feature dataset.

In this embodiment, the step S400 specifically includes the following sub-steps.

S410. Based on the clustered logging data with stratigraphic information, an average value of the clustered logging data with stratigraphic information at a same stratum depth is calculated for a same imaging type, and an average value of standardized amplified density distribution clustered logging data, an average value of standardized amplified gamma distribution clustered logging data, and an average value of standardized amplified resistivity distribution clustered logging data are acquired.

S420. The average value of the standardized amplified density distribution clustered logging data, the average value of the standardized amplified gamma distribution clustered logging data, and the average value of the standardized amplified resistivity distribution clustered logging data are reduced to one dimension by a principal component analysis (PCA) dimensionality reduction method to acquire the first dimensionality-reduced logging data, where the first dimensionality-reduced logging data includes density distribution dimensionality-reduced logging data $w_{den}$, gamma distribution dimensionality-reduced logging data $w_{gr}$, and resistivity distribution dimensionality-reduced logging data $w_{rt}$.

S430. Based on the first dimensionality-reduced logging data and the stratum thicknesses $d_{str}$, the LWD feature dataset is constructed.

S500. Based on the LWD feature dataset, an LWD photoelectric data prediction curve is acquired through a trained missing curve prediction model; and In this embodiment, the LWD photoelectric data prediction curve is acquired through the trained missing curve prediction model as follows:

The missing curve prediction model is trained, including a t-channel image recognition network with 2t convolutional layers and 2t average pooling layers. Each channel includes a first convolutional layer, a first average pooling layer, a second convolutional layer and a second average pooling layer that are sequentially connected. Each convolutional layer has a different size. An f-th channel includes a (4×f−1)×(4×f−1) first convolutional layer, a (4×f+4)×(4×f+4) second convolutional layer, and 2×2 pooling layers. All the channels are connected together to one fully connected layer and one naive Bayesian decision maker.

Figure 3:
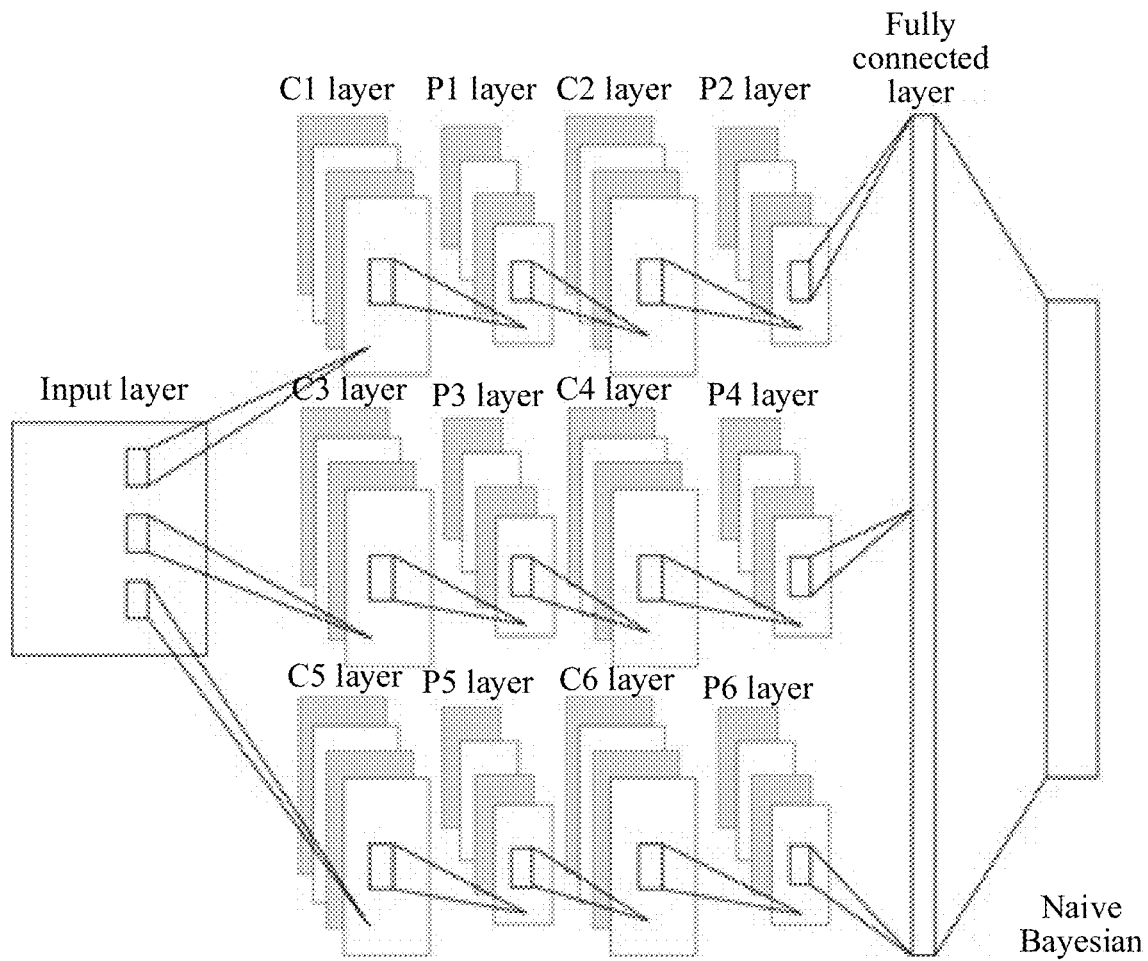
FIG. 3 is a structural diagram of a missing curve prediction model according to an embodiment of the present disclosure.

In this embodiment, the missing curve prediction model is shown in FIG. 3. A C1 layer convolves the input image through 8 3×3 convolution kernels to generate 8 190×190 feature maps. Pooling layer P1 pools the convolutional layer C1 in 2×2 units. The P1 layer includes 8 95×95 feature maps. P1 is convolved through 16 8×8 convolution kernels to acquire convolutional layer C2, which includes 16 88×88 feature maps. C2 is pooled in 2×2 units to generate pooling layer P2, which includes 16 44×44 feature maps.

The C3 layer convolves the input image through 8 7×7 convolution kernels to generate 8 186×186 feature maps. Pooling layer P3 pools the convolutional layer C3 in 2×2 units. The P3 layer includes 8 93×93 feature maps. P3 is convolved through 16 12×12 convolution kernels to generate convolutional layer C4, which includes 16 82×82 feature maps. C4 is pooled in 2×2 units to generate pooling layer P4, which includes 16 41×41 feature maps.

A C5 layer convolves the input image through 8 11×11 convolution kernels to generate 8 182×182 feature maps. The pooling layer P5 pools the convolutional layer C5 in 2×2 units. The P5 layer includes 8 91×91 feature maps. P5 is convolved through 16 16×16 convolution kernels to generate the convolutional layer C5, which includes 16 76×76 feature maps. C6 is pooled in 2×2 units to generate pooling layer P6, which includes 16 38×38 feature maps.

The first convolutional layer of a first channel, the first convolutional layer of a second channel, and the first convolutional layer of a third channel are denoted as C1, C3, and C5 layers, respectively. The C1 layer is configured to convolve an input image through 8 $h_t \times h_t$ convolution kernels. The C3 layer is configured to convolve an input image through 8 $3h_t \times 3h_t$ convolution kernels. The C5 layer is configured to convolve an input image through 8 $5h_t \times 5h_t$ convolution kernels.

$$con_{p,q}^l = \sum_{m1=1}^{L} \sum_{m2=1}^{W} CON_{m1,m2}^{l-1} \times ker_{p,q}^l + b_{p,q}^l;$$

where, $con_{p,q}^l$ denotes a convolution result at position (p, q); l denotes a current layer number; CON denotes a matrix covered by the convolution kernels; L and W denote a length and a width of the matrix covered by the convolution kernels; m1 and m2 denote serial numbers of lengths of the convolution kernels, m1 ranging from 1 to L, and m2 ranging from 1 to W; ker denotes a kernel function; and b denotes a corresponding bias term.

The convolved features are non-linearized to well fit the different distribution characteristics of various curve features.

The convolution result is fitted through a ReLU function to acquire a fitted convolution result.

If the entire model uses convolutional layers, the parameters will be too large, making the model prone to overfitting. The pooling layer can further reduce the dimensionality of matrix data, thereby optimizing the number of parameters and reducing computational complexity. Meanwhile, the pooling layer can enhance the translation and rotation invariance of matrix features, thereby improving the model's generalization ability.

Upsampling pooling is performed on the fitted convolution result:

$$con_{m3,m4}^l = \max(CON_{m1,m2}^{l-1})$$

where, $con_{m3,m4}^l$ denotes a two-dimensional matrix representation of a pooled convolution result; and (m3, m4) denotes a position of the convolution result.

The pooled convolution result is converted into a tiled one-dimensional feature vector through a tiling layer.

After the matrix is processed by multiple convolution and pooling layers, a representative feature is extracted, which needs to be transformed into a discriminative feature vector. Therefore, the tiling layer transforms the feature into a one-dimensional feature vector, weakening the spatial characteristic of the feature. The fully connected layer performs feature dimensionality reduction and integration to acquire a final curve feature for discrimination. A larger number of fully connected layers or neurons is better to improve the predictive ability of the curve feature, but this can easily lead to overfitting. Therefore, it is necessary to control the parameter of the fully connected layer.

The tiled one-dimensional feature vector is integrated through the fully connected layer:

$$con_{key}^l = \sum_{r=1}^{R} con_r^{key-1} \cdot w_r^l + b_r^l;$$

where, $con_{key}^l$ denotes a one-dimensional matrix representation of a feature after the integration through the fully connected layer; l denotes the current layer number; key denotes an index value of a one-dimensional matrix; R denotes a length of a feature vector in an (l−1)-th layer; w denotes a weight matrix; b denotes the bias term; and r denotes a serial number of a data point of the feature vector.

The naive Bayesian decision maker is introduced into the fully connected layer.

The integrated tiled one-dimensional feature vector is taken as the LWD photoelectric data prediction curve.

In the fully connected layer, a naive Bayesian decision maker replaces a Softmax decision maker. As for the naive Bayesian decision maker, when given a target value, attributes are conditionally independent of each other, reducing computational parameters and saving energy consumption and time. In addition, the algorithm is simple, fast, and more conducive to real-time curve recognition while drilling.

When encountering a complex formation, due to the different sizes of convolution kernels, the extracted features can reflect the different hierarchical features of the AC curve, effectively improving the prediction accuracy of the AC curve. A smaller-size convolution kernel reflects a shallower feature, while a larger-size convolution kernel reflects a deeper feature.

In this embodiment, the method further includes a step of model performance evaluation.

The model is evaluated using two statistical performance indicators: mean absolute percentage error (MAPE) and root mean square error (RMSE). The purpose of MAPE and RMSE is to evaluate model performance by comparing an error between model output and prediction, with a smaller error value indicating better model performance. The MAPE and RMSE are calculated as follows.

$$MAPE = \frac{100}{N} \sum_{i=1}^{N} \left| \frac{y_m - y_p}{y_m} \right|;$$

$$RMSE = \sqrt{\frac{\sum_{i=1}^{N} (\overline{y}_p - y_m)^2}{N}};$$

where, N denotes a number of observations; $y_m$ denotes measured data; $y_p$ denotes predicted data; and $\overline{y}_p$ denotes an average of the predicted data.

S600. Based on the LWD photoelectric data prediction curve, an average value of photoelectric data of each stratum is calculated, and a lithology evaluation result of each stratum is acquired.

These steps are described in order in the above embodiments. However, those skilled in the art may understand that, in order to achieve the effects of these embodiments, different steps may not be necessarily executed in such an order, but may be executed simultaneously (in parallel) or in a reversed order. These simple changes should fall within the protection scope of the present disclosure.

A second embodiment of the present disclosure provides a sand shale formation lithology evaluation system for precise deep oil and gas navigation. Modules of the system are described as follows.

A data amplification module is configured to: acquire logging distribution data of a target location, where the logging distribution data includes density distribution data, gamma distribution data and resistivity distribution data, where the density distribution data, the gamma distribution data and the resistivity distribution data are represented as 8-sector data; and amplify the density distribution data, the gamma distribution data and the resistivity distribution data of the target location through an Akima interpolation method to acquire amplified logging distribution data, where the amplified logging distribution data is represented as 32-sector data, including amplified density distribution data, amplified gamma distribution data, and amplified resistivity distribution data. Specifically, the density distribution data, the gamma distribution data and the resistivity distribution data of the target location are amplified through an Akima interpolation method to acquire amplified logging distribution data as follows.

For any two adjacent data points $x_k$ and $x_{k+1}$, (k=0, 1, 2, . . . , n):

A constraint condition for a fitted curve is acquired:

$$\begin{cases} y_k = S(x_k) \\ y_{k+1} = S(x_{k+1}) \\ y'_k = t_k \\ y'_{k+1} = t_{k+1} \end{cases};$$

where, $y_k$ denotes an actual logging value at $x_k$; $y_{k+1}$ denotes an actual logging value at $x_{k+1}$; $t_k$ denotes a slope of the fitted curve at $x_k$ and $x_{k+1}$; $t_{k+1}$ denotes a slope at $x_{k+1}$ and $x_{k+2}$; $S(x_k)$ denotes a value of a cubic polynomial interpolation equation at $x_k$; $y_k'$ denotes a slope of the actual logging value at $x_k$; and $y_{k+1}'$ denotes a slope of the actual logging value at $x_{k+1}$.

The cubic polynomial interpolation equation is constructed:

$$S(x) = c_0 + c_1(x-x_k) + c_2(x-x_k)^2 + c_3(x-x_k)^3$$

where, $S(x)$ denotes an interval function corresponding to an interval of $[x_k, x_{k+1}]$; $x_k$ and $x_{k+1}$ denote two adjacent data points; and $c_0$, $c_1$, $c_2$, and $c_3$ are constant parameters to be determined.

An interpolation point for each interval is calculated based on the cubic polynomial interpolation equation.

Based on the interpolation point, an interval interpolation equation is calculated through adjacent data points.

$t_k$ and $t_{k+1}$ are expressed as follows:

$$t_k = \frac{|m_{k+1} - m_k|m_{k+1} + |m_{k-1} - m_{k-2}|m_k}{|m_{k+1} - m_k| + |m_{k-1} - m_{k-2}|}; \text{ and}$$

$$t_{k+1} = \frac{|m_{k+2} - m_{k+1}|m_k + |m_k - m_{k-1}|m_{k+1}}{|m_{k+2} - m_{k+1}| + |m_k - m_{k-1}|};$$

where, $m_k$ denotes the slope at the two data points $x_k$ and $x_{k+1}$:

$$m_k = \frac{y_{k+1} - y_k}{x_{k+1} - x_k}.$$

$m_{k+1}$ denotes a slope at two data points $x_{k+1}$ and $x_{k+2}$; $m_{k-1}$ denotes a slope at two data points $x_{k-1}$ and $x_k$; $m_{k-2}$ denotes a slope at two data points $x_{k-2}$ and $x_{k-1}$; and $m_{k+2}$ denotes a slope at two data points $x_{k+2}$ and $x_{k+3}$.

Thus, the amplified logging distribution data are acquired.

A data clustering module is configured to standardize the amplified logging distribution data to acquire standardized amplified logging distribution data, where the standardized amplified logging distribution data includes standardized amplified density distribution data, standardized amplified gamma distribution data, and standardized amplified resistivity distribution data; and cluster the amplified logging distribution data to acquire clustered logging data.

A stratigraphic information addition module is configured to perform stratigraphic division based on the clustered logging data, acquire stratum thicknesses $d_{str}$, and assign stratum labels to the clustered logging data to acquire clustered logging data with stratigraphic information.

A weight calculation module is configured to perform dimensionality reduction on the clustered logging data with stratigraphic information to acquire first dimensionality-reduced logging data, and take the first dimensionality-reduced logging data as a weight parameter of the standardized amplified logging distribution data to acquire an LWD feature dataset.

A missing curve prediction module is configured to acquire, based on the LWD feature dataset, an LWD photoelectric data prediction curve through a trained missing curve prediction model.

A formation lithology evaluation module is configured to calculate, based on the LWD photoelectric data prediction curve, an average value of photoelectric data of each stratum, and acquire a lithology evaluation result of each stratum.

Those skilled in the art should clearly understand that, for convenience and brevity of description, reference is made to corresponding processes in the above method embodiments for specific working processes and related description of the system, and details are not described herein again.

It should be noted that the sand shale formation lithology evaluation system for precise deep oil and gas navigation in the above embodiments is only described by taking the division of the above functional modules as an example. In practical applications, the above functions can be completed by different functional modules as required, that is, the modules or steps in the embodiments of the present disclosure are further decomposed or combined. For example, the modules in the above embodiments may be combined into one module, or may be further divided into a plurality of sub-modules to complete all or part of the functions described above. The names of the modules and steps involved in the embodiments of the present disclosure are only for distinguishing each module or step, and should not be regarded as improper limitations on the present disclosure.

Those skilled in the art should clearly understand that, for convenience and brevity of description, reference is made to corresponding processes in the above method embodiments for specific working processes and related description of the storage device and processing device, and details are not described herein again.

Those skilled in the art should be aware that the modules and method steps of the examples described in the embodiments disclosed herein may be implemented by electronic hardware, computer software or a combination thereof. The programs corresponding to software modules and method steps may be placed in random access memory (RAM), internal memory, read-only memory (ROM), electrically programmable ROM, electrically erasable programmable ROM, registers, hard disk, removable disk, compact disc read-only memory (CD-ROM), or in any other form of storage medium known in the technical field. In order to clearly illustrate the interchangeability of the electronic hardware and software, the composition and steps of each example are generally described in accordance with the function in the above description. Whether the functions are performed by electronic hardware or software depends on particular applications and design constraint condition of the technical solutions. Those skilled in the art may use different methods to implement the described functions for each specific application, but such implementation should not be considered to be beyond the scope of the present disclosure.

Terms such as "first" and "second" are intended to distinguish between similar objects, rather than describe or indicate a specific order or sequence.

Terms "include", "comprise" or any other variations thereof are intended to cover non-exclusive inclusions, so that a process, a method, an article, or a device/apparatus including a series of elements not only includes those elements, but also includes other elements that are not explicitly listed, or also includes inherent elements of the process, the method, the article or the device/apparatus.

The technical solutions of the present disclosure are described in the preferred implementations with reference to the drawings. Those skilled in the art should easily understand that the protection scope of the present disclosure is apparently not limited to these specific implementations. Those skilled in the art can make equivalent changes or substitutions to the relevant technical features without departing from the principles of the present disclosure, and the technical solutions derived by making these changes or substitutions should fall within the protection scope of the present disclosure.

The invention claimed is:

1. A sand shale formation lithology method for precise deep oil and gas navigation and drilling, comprising:
   S100: acquiring logging distribution data of a target location, wherein the logging distribution data comprises density distribution data, gamma distribution data and resistivity distribution data, wherein the density distribution data, the gamma distribution data and the resistivity distribution data are represented as 8-sector data; and amplifying the density distribution data, the gamma distribution data and the resistivity distribution data of the target location through an Akima interpolation method to acquire amplified logging distribution data, wherein the amplified logging distribution data is represented as 32-sector data, comprising amplified density distribution data, amplified gamma distribution data, and amplified resistivity distribution data;
   wherein the step of amplifying the density distribution data, the gamma distribution data and the resistivity distribution data of the target location through the Akima interpolation method to acquire the amplified logging distribution data comprises:
   for any two adjacent data points $x_k$ and $x_{k+1}$, (k=0, 1, 2, ..., n):
   acquiring a constraint condition for a fitted curve:

$$\begin{cases} y_k = S(x_k) \\ y_{k+1} = S(x_{k+1}) \\ y'_k = t_k \\ y'_{k+1} = t_{k+1} \end{cases};$$

wherein, $y_k$ denotes an actual logging value at $x_k$; $y_{k+1}$ denotes an actual logging value at $x_{k+1}$; $t_k$ denotes a slope of the fitted curve at $x_k$ and $x_{k+1}$; $t_{k+1}$ denotes a slope at $x_{k+1}$ and $x_{k+2}$; $S(x_k)$ denotes a value of a cubic polynomial interpolation equation at $x_k$; $y_k'$ denotes a slope of the actual logging value at $x_k$; and $y_{k+1}'$ denotes a slope of the actual logging value at $x_{k+1}$;

constructing the cubic polynomial interpolation equation:

$$S(x) = c_0 + c_1(x - x_k) + c_2(x - x_k)^2 + c_3((x - x_k)^3;$$

wherein, S(x) denotes an interval function corresponding to an interval of $[x_k, x_{k+1}]$; $x_k$ and $x_{k+1}$ denote two adjacent data points; and $c_0$, $c_1$, $c_2$, and $c_3$ are constant parameters to be determined;

calculating an interpolation point for each interval based on the cubic polynomial interpolation equation;

calculating, based on the interpolation point, an interval interpolation equation through adjacent data points;

wherein, $t_k$ and $t_{k+1}$ are expressed as follows:

$$t_k = \frac{|m_{k+1} - m_k|m_{k+1} + |m_{k-1} - m_{k-2}|m_k}{|m_{k+1} - m_k| + |m_{k-1} - m_{k-2}|};$$

$$t_{k+1} = \frac{|m_{k+2} - m_{k+1}|m_k + |m_k - m_{k-1}|m_{k+1}}{|m_{k+2} - m_{k+1}| + |m_k - m_{k-1}|};$$

wherein, $m_k$ denotes the slope at the two data points $x_k$ and $x_{k+1}$:

$$m_k = \frac{y_{k+1} - y_k}{x_{k+1} - x_k};$$

$m_{k+1}$ denotes a slope at two data points $x_{k+1}$ and $x_{k+2}$; $m_{k-1}$ denotes a slope at two data points $x_{k-1}$ and $x_k$; $m_{k-2}$ denotes a slope at two data points $x_{k-2}$ and $x_{k-1}$; $m_{k+2}$ denotes a slope at two data points $x_{k+2}$ and $x_{k+3}$; and thus, the amplified logging distribution data are acquired;

S200: standardizing the amplified logging distribution data to acquire standardized amplified logging distribution data, wherein the standardized amplified logging distribution data comprises standardized amplified density distribution data, standardized amplified gamma distribution data, and standardized amplified resistivity distribution data; and clustering the amplified logging distribution data to acquire clustered logging data;

S300: performing stratigraphic division based on the clustered logging data, acquiring stratum thicknesses $d_{str}$, and assigning stratum labels to the clustered logging data to acquire clustered logging data with stratigraphic information;

S400: performing dimensionality reduction on the clustered logging data with stratigraphic information to acquire first dimensionality-reduced logging data, and taking the first dimensionality-reduced logging data as a weight parameter of the standardized amplified logging distribution data to acquire a logging-while-drilling (LWD) feature dataset;

S500: acquiring, based on the LWD feature dataset, an LWD photoelectric data prediction curve through a trained missing curve prediction model;

wherein, the LWD photoelectric data prediction curve is acquired through the trained missing curve prediction model as follows:

forming the missing curve prediction model, comprising a t-channel image recognition network with 2t convolutional layers and 2t average pooling layers, wherein each channel comprises a first convolutional layer, a first average pooling layer, a second convolutional layer and a second average pooling layer that are sequentially connected; each convolutional layer has a different size; an f-th channel comprises a (4×f−1)×(4×f−1) first convolutional layer, a (4×f+4)×(4×f+4) second convolutional layer, and 2×2 pooling layers; and all the channels are connected together to one fully connected layer and one naive Bayesian decision maker;

denoting the first convolutional layer of a first channel, the first convolutional layer of a second channel, and the first convolutional layer of a third channel as a C1 layer, a C3 layer, and a C5 layer, respectively, wherein the C1 layer is configured to convolve an input image through 8 $h_t \times h_t$ convolution kernels; the C3 layer is configured to convolve an input image through 8 $3h_t \times 3h_t$ convolution kernels; and the C5 layer is configured to convolve an input image through 8 $5h_t \times 5 h_t$ convolution kernels, wherein a convolution result is calculated as follows:

$$con^l_{p,q} = \sum_{m1=1}^{L} \sum_{m2=1}^{W} CON^{l-1}_{m1,m2} \times ker^l_{p,q} + b^l_{p,q};$$

wherein, $con^l_{p,q}$ denotes the convolution result at a position (p, q); l denotes a current layer number; CON denotes a matrix covered by the convolution kernels; L and W denote a length and a width of the matrix covered by the convolution kernels; m1 and m2 denote serial numbers of lengths of the convolution kernels, m1 ranging from 1 to L, and m2 ranging from 1 to W; ker denotes a kernel function; and b denotes a corresponding bias term;

fitting the convolution result through a rectified linear unit (ReLU) function to acquire a fitted convolution result;

performing upsampling pooling on the fitted convolution result:

$$con^l_{m3,m4} = \max(CON^{l-1}_{m1,m2});$$

wherein, $con^l_{m3, m4}$ denotes a two-dimensional matrix representation of a pooled convolution result; and (m3, m4) denotes a position of the convolution result;

converting the pooled convolution result into a tiled one-dimensional feature vector through a tiling layer;

integrating the tiled one-dimensional feature vector through the fully connected layer:

$$con^l_{key} = \sum_{r=1}^{R} con^{key-1}_r \cdot w^l_r + b^l_r;$$

wherein, $con^l_{key}$ denotes a one-dimensional matrix representation of a feature after the integration through the fully connected layer; l denotes the current layer number; key denotes an index value of a one-dimensional matrix; R denotes a length of a feature vector in an (l−1)-th layer; w denotes a weight matrix; b denotes the bias term; and r denotes a serial number of a data point of the feature vector;

introducing the naive Bayesian decision maker into the fully connected layer; and taking the integrated tiled one-dimensional feature vector as the LWD photoelectric data prediction curve;

S600: calculating, based on the LWD photoelectric data prediction curve, an average value of photoelectric data of each stratum, and acquiring a lithology evaluation result of each stratum; and S700: placing and drilling a well based on the average value of photoelectric data of each stratum and the lithology evaluation result of each stratum.

2. The sand shale formation lithology evaluation method for precise deep oil and gas navigation according to claim 1, wherein the step S200 comprises:

S210: taking the amplified logging distribution data as data to be clustered, and calculating distances $d[(y_{i1}, y_{i2}) (y_{j1}, y_{j2})]$ between all nodes:

$$d[(y_{i1}, y_{i2}), (y_{j1}, y_{j2})] = \left(\sum_{k=1}^{2} |y_{ik} - y_{jk}|^2\right)^{1/2};$$

wherein, k denotes a coordinate marker; $(y_{i1}, y_{i2})$ and $(y_{j1}, y_{j2})$ denote positions of first and second nodes, respectively; i and j denote serial numbers of the nodes, respectively; and $y_{ik}$ and $y_{jk}$ denote positions of two different nodes;

S220: setting a cut-off distance dc, and clustering upcoming logging data into five clusters based on the distances between the nodes, wherein the five clusters comprise four marker layer clusters and one destination layer cluster;

S230: calculating, based on the data to be clustered, a density $\rho_i$ of each node:

$$\rho_i = \sum_j x(d_{ij} - dc);$$

wherein, the density $\rho_i$ denotes a number of nodes each with a distance from the i-th node less than the cut-off distance dc; and $d_{ij}$ denotes a distance between the i-th node and the j-th node;

S240: calculating, based on the data to be clustered, a relative distance $\delta$ of each node:

$$\delta_i = \begin{cases} \max(d_{ij}), & \rho_i > \rho_j \\ \min(d_{ij}), & \rho_i \leq \rho_j \end{cases};$$

wherein, the relative distance of the i-th node is denoted as $\delta_i$; if the density of the i-th node is not the largest among all the nodes, a distance from the i-th node to the nearest j-th node with a larger density than the i-th node is selected; and if the density of the i-th node is the largest among all the nodes, a largest distance from the i-th node to the nearest j-th node is calculated;

S250: selecting, based on the data to be clustered, a point with the relative distance δ larger than a preset first threshold and the density larger than a preset second threshold as a cluster center; and S260: assigning all data points that are not cluster centers to a nearest cluster center with the largest density to acquire the clustered logging data, wherein the clustered logging data comprises a mapping relationship between a marker layer and a non-marker layer.

3. The sand shale formation lithology evaluation method for precise deep oil and gas navigation according to claim 2, wherein the step S300 comprises:

acquiring, based on the clustered logging data, the thicknesses $d_{str}$ of five strata, str∈(1, 2, 3, 4, 5), wherein data points of the five strata are $5 \times d_{str}$;

and assigning stratum labels to the clustered logging data to acquire the clustered logging data with stratigraphic information.

4. The sand shale formation lithology evaluation method for precise deep oil and gas navigation according to claim 1, wherein the step S400 comprises:

S410: calculating, based on the clustered logging data with stratigraphic information, an average value of the clustered logging data with stratigraphic information at a same stratum depth for a same imaging type, and acquiring an average value of standardized amplified density distribution clustered logging data, an average value of standardized amplified gamma distribution clustered logging data, and an average value of standardized amplified resistivity distribution clustered logging data;

S420: reducing, by a principal component analysis (PCA) dimensionality reduction method, the average value of the standardized amplified density distribution clustered logging data, the average value of the standardized amplified gamma distribution clustered logging data, and the average value of the standardized amplified resistivity distribution clustered logging data to one dimension to acquire the first dimensionality-reduced logging data, wherein the first dimensionality-reduced logging data comprises density distribution dimensionality-reduced logging data $w_{den}$, gamma distribution dimensionality-reduced logging data $w_{gr}$, and resistivity distribution dimensionality-reduced logging data $w_{rt}$; and S430: based on the first dimensionality-reduced logging data and the stratum thicknesses $d_{str}$, constructing the LWD feature dataset.

* * * * *